(12) United States Patent
Weber et al.

(10) Patent No.: US 8,628,134 B2
(45) Date of Patent: Jan. 14, 2014

(54) LINING OF A VEHICLE PART

(75) Inventors: Robert Weber, Krefeld (DE); Karsten Pursche, Muenchsmuenster (DE); Josef Budke, Krefeld (DE); Michael Welz, Nettetal (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/501,239

(22) PCT Filed: Oct. 15, 2010

(86) PCT No.: PCT/EP2010/006312
§ 371 (c)(1),
(2), (4) Date: Jun. 18, 2012

(87) PCT Pub. No.: WO2011/045074
PCT Pub. Date: Apr. 21, 2011

(65) Prior Publication Data
US 2012/0248809 A1   Oct. 4, 2012

(30) Foreign Application Priority Data
Oct. 15, 2009   (DE) .......................... 10 2009 049 631

(51) Int. Cl.
*B60R 13/02*   (2006.01)

(52) U.S. Cl.
USPC ....................................... 296/39.1; 296/146.6

(58) Field of Classification Search
USPC ......... 296/39.1, 70, 153, 146.1, 146.7, 146.6; 280/751
See application file for complete search history.

(56) References Cited

U.S. PATENT DOCUMENTS

| | | | |
|---|---|---|---|
| 5,868,455 A | 2/1999 | Springer et al. | |
| 7,559,599 B2 * | 7/2009 | Kaplanov et al. | 296/146.7 |
| 2009/0302635 A1 * | 12/2009 | Nakamura | 296/146.9 |

FOREIGN PATENT DOCUMENTS

| | | |
|---|---|---|
| DE | 3441176 A1 | 5/1986 |
| DE | 19501292 A1 | 7/1996 |
| DE | 19735917 A1 | 2/1999 |
| DE | 10064680 A1 | 8/2002 |
| DE | 10120099 C1 | 9/2002 |
| DE | 10245739 A1 | 4/2004 |
| DE | 102005036771 A1 | 9/2006 |
| DE | 102007050398 A1 | 4/2009 |
| WO | 2007111782 A1 | 10/2007 |

OTHER PUBLICATIONS

International Search Report for application No. PCT/EP2010/006312 mailed Feb. 8, 2010.

* cited by examiner

*Primary Examiner* — Glenn Dayoan
*Assistant Examiner* — Pinel Romain
(74) *Attorney, Agent, or Firm* — Fletcher Yoder P.C.

(57) ABSTRACT

A lining for a vehicle part is disclosed. The lining has a main body that comprises a reinforcement. The main body and the reinforcement are made of the same material. The reinforcement may be made of a material removed from the main body. The lining may also include a decorative layer. A method for producing such a lining is also disclosed.

17 Claims, 2 Drawing Sheets

LINING OF A VEHICLE PART

CROSS REFERENCE TO RELATED APPLICATIONS

This application claims priority from and the benefit of PCT Application No. PCT/EP2010/006312, filed on Oct. 15, 2010 and German Patent DE 10 2009 049 631.9, filed on Oct. 15, 2009; both entitled "Lining of a Vehicle Part", which are herein incorporated by reference.

BACKGROUND

The present invention relates to the lining of a vehicle part having a main body which comprises a reinforcement.

Such linings are used, in particular, in the field of the internal equipment of a vehicle and are disclosed, for example, in DE 10 2007 050 398 A1, DE 100 64 680 A1, DE 195 01 292 A1 and DE 101 20 099 C1. The lining parts disclosed therein are, however, of relatively costly design and/or are relatively costly to produce.

SUMMARY

It was, therefore, the object of the present invention to provide a lining of a vehicle part which does not have the drawbacks of the prior art.

The object is achieved by a lining of a vehicle part having a main body which comprises a reinforcement, wherein the main body and the reinforcement are made from the same material.

The present invention relates to the lining of a vehicle part. Such linings are located, in particular, in the interior of the vehicle. For example, the invention relates to a vehicle body lining, in particular a door lining. A lining within the meaning of the invention, however, is also the instrument panel.

Such linings are nowadays generally made from plastics and/or a natural fiber material and are formed in a three-dimensional manner. Said forming process may, for example, be implemented by pressing planar material plates. Alternatively, however, it is conceivable to produce the lining in a casting, injection-molding or spraying method.

According to the invention, the main body comprises a reinforcement which is used to reinforce the main body locally. The reinforcement is a separate component. Said reinforcement may, for example, be arranged in the region of the recess, for example, for loud speakers, map cases or the like. Alternatively or additionally it is conceivable that units, in particular electrical units such as for example window lifters or parts of an infotainment system, are arranged on said main body. Preferably, the reinforcements may also be arranged in said regions.

According to the invention, it is thus provided that the main body and the reinforcement are made from the same material. Preferably, the reinforcement is connected non-positively, positively and/or by a material connection to the main body. Quite particularly preferably, the main body and the reinforcement are pressed together, resulting in a positive, non-positive and/or material connection. Most preferably, both the plate for the main body and for the reinforcement are inserted together into a mold and pressed together there into their final shape.

Preferably, the main body comprises recesses which are machined, for example stamped, out of the main body. Quite particularly preferably, said material is used for producing the reinforcements. As a result, the reinforcement consists of material removed from the main body.

Preferably, the reinforcement bears at least partially flat on the main body. Said flat reinforcement, however, preferably comprises structures, in particular three-dimensional structures, which improve the mechanical stability thereof. Such structures may be ribs or the like.

In a further preferred embodiment, the reinforcements are at least partially aligned perpendicular to the main body and also improve locally the mechanical stability of the main body.

A further subject of the present invention is a method for producing a lining of a vehicle part, having a main body which comprises a recess and a reinforcement, in which the recess is incorporated in the main body and the material obtained thereby is used for producing the reinforcement.

The embodiments set forth for the lining according to the invention apply to the method according to the invention and vice versa.

Preferably the reinforcement is connected, preferably pressed, to the main body.

According to a further preferred embodiment of the method according to the invention, the material of the reinforcement is processed, preferably formed, before being connected. Such a forming process may consist of the outer contour of the reinforcement being altered, for example by cutting or other material-removing methods. Forming in the sense of this preferred embodiment, however, also means that the material of the reinforcement is formed, for example by the application of force and/or heat, before being connected.

DRAWINGS

The invention is described hereinafter with reference to FIGS. 1 to 2. Said descriptions are provided merely by way of example and do not limit the general inventive idea. Said descriptions apply equally to the lining according to the invention and to the method according to the invention.

DETAILED DESCRIPTION

Figure 1A:
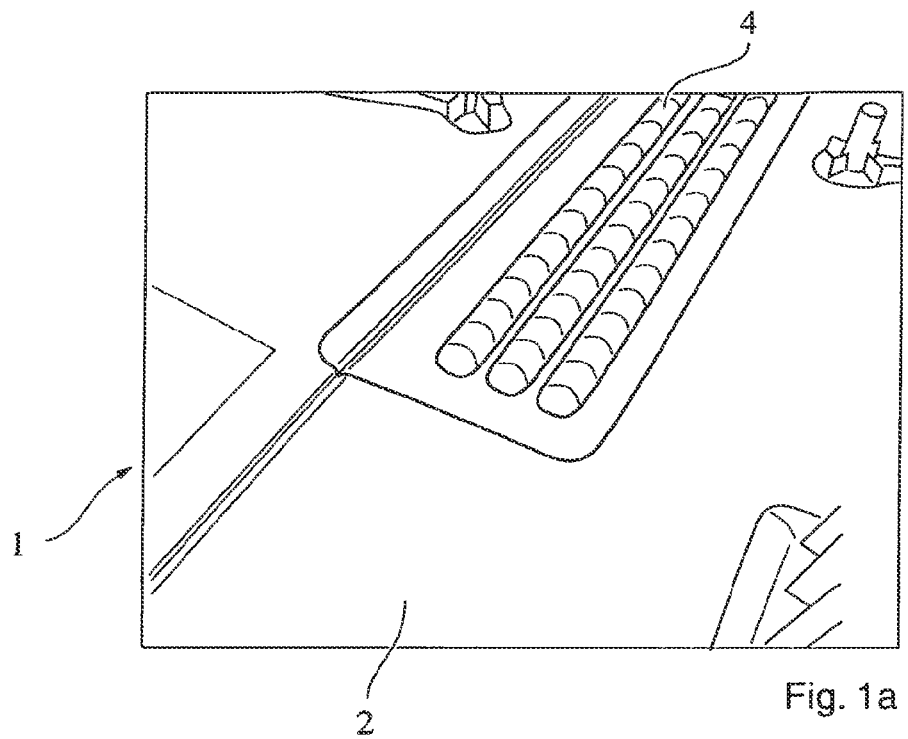
FIGS. 1a and 1b show a first embodiment of the lining according to the invention.
Figure 1B:
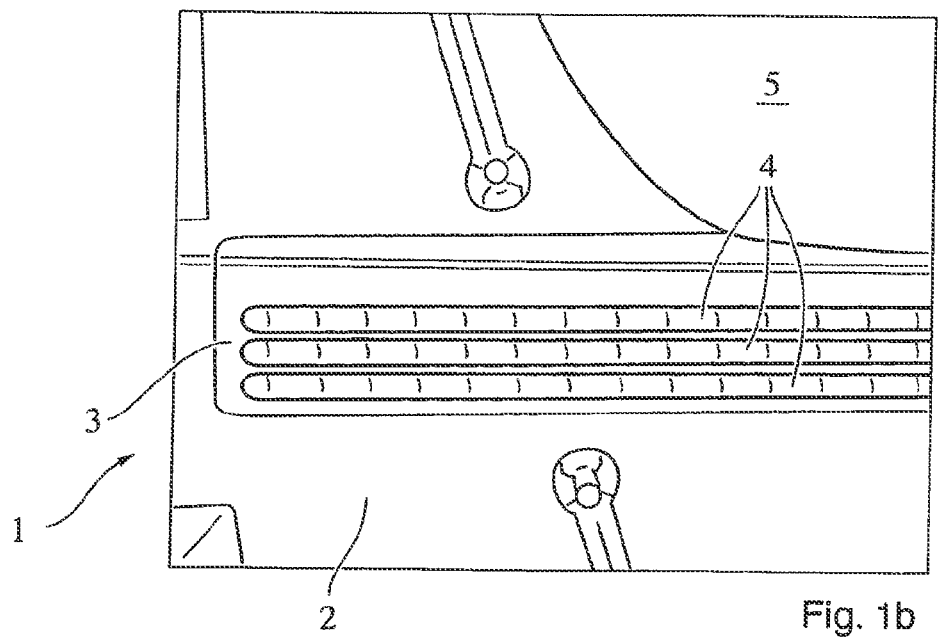

A door lining 1 according to the invention is shown in a first embodiment in FIGS. 1a and 1b. Said lining comprises a main body 2 which is provided with a reinforcement 3. The main body and the reinforcement consist in this case of a natural fiber material. The main body has been formed, for example pressed, into its three-dimensional shape which is shown. The reinforcement 3 is of the same material from which the main body 2 is made. Preferably, the material of the reinforcement 3 is material which has been previously removed from, for example stamped out of, the main body 2. The stamping-out of the material may take place during the forming process. As a result, material may be saved and waste reduced. The person skilled in the art understands that, although the base plate and the reinforcement consist of the same material, the reinforcement may consist of material which has been produced during the manufacture of a previously manufactured lining.

Before the connection of the reinforcement 3 to the main body 2, the structure 4, in this case three reinforcement ribs, are integrally formed therein, in order to increase the mechanical stability, in particular the bending stiffness, thereof.

The part according to FIG. 1a is shown again in FIG. 1b. The connection between the main body 2 and the reinforcement 3 is carried out by pressing. As a result, a non-positive, positive or material connection is produced.

Figure 2:
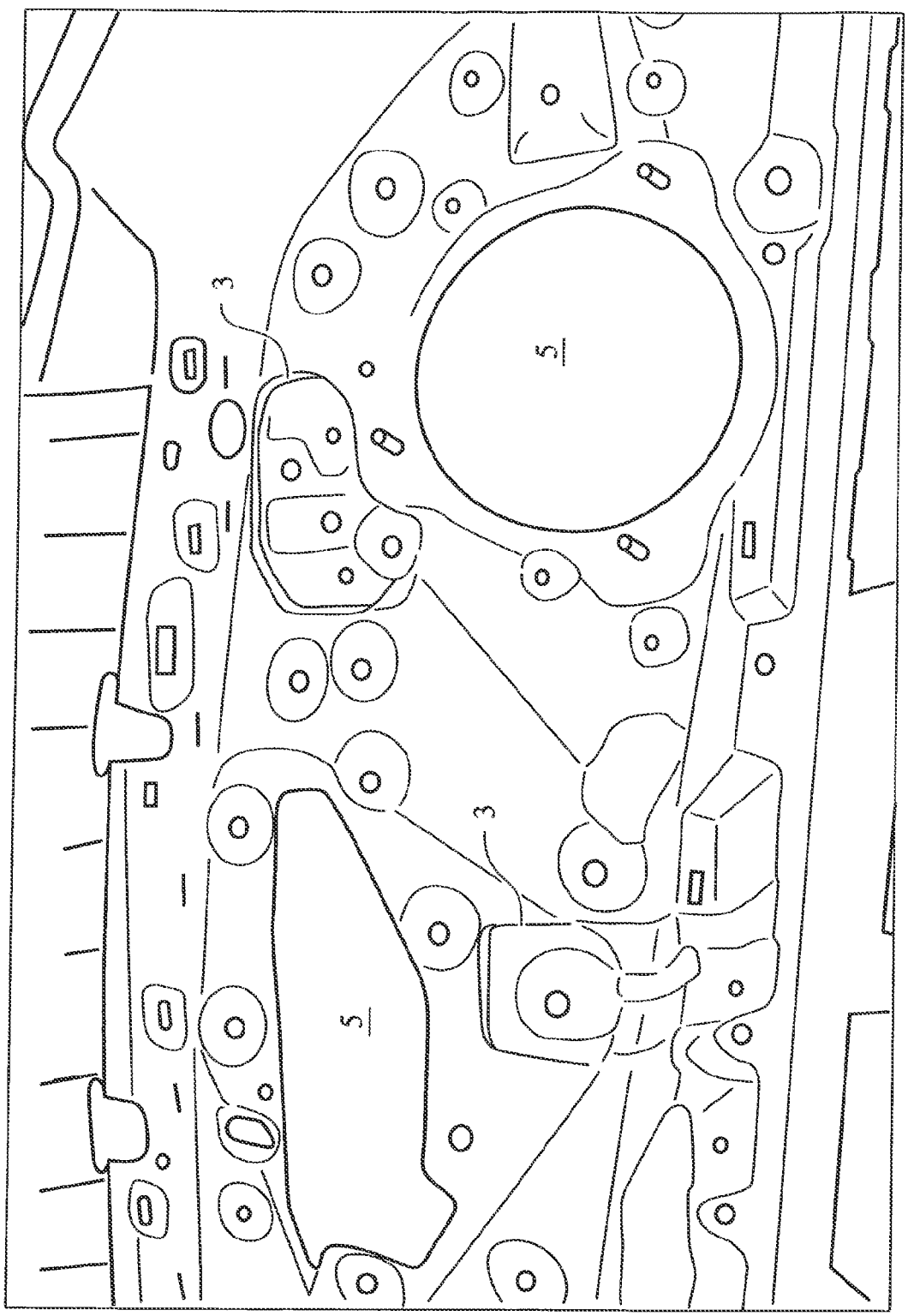
FIG. 2 shows a further embodiment of the lining according to the invention.

In FIG. 2, a further door lining is shown. Said door lining also comprises recesses 5 and reinforcements 3. The recesses 5 have been incorporated, in this case stamped, into the main body 2. The reinforcement 3 in the present case is partially flat and comprises a ring which is perpendicular to the plane of the main body 2 so as to increase, in turn, the mechanical stability of the lining according to the invention, in particular against bending.

The person skilled in the art recognizes that the reinforcements may be arranged on both sides of the main body. The person skilled in the art understands, moreover, that after it has been arranged on the main body, the reinforcement may be subjected to a further process, for example a material-removing process.

Moreover, the person skilled in the art recognizes that the lining on the side remote from the passenger compartment may be coated with a water-repellent coating and on the side facing the passenger compartment with a decorative layer. Moreover, foam layers and the like may also be arranged on the lining.

The invention claimed is:

1. A lining of a vehicle part comprising:
   a main body made from a natural fiber; and
   a reinforcement that is a separate component from the main body, wherein the reinforcement is made from a portion of the natural fiber that is removed from the main body or a second main body made from the natural fiber, and wherein the reinforcement is connected to the main body by a material connection.

2. The lining as claimed in claim 1, wherein the reinforcement bears at least partially flat on the main body.

3. The lining as claimed in claim 1, wherein the reinforcement is at least partially aligned perpendicular to the main body.

4. The lining as claimed in claim 1, wherein the reinforcement comprises a structure.

5. A method for producing a lining of a vehicle part having a main body which comprises a recess and a reinforcement, comprising:
   forming the recess having a first size in a natural fiber material of the main body by removing a first cutout portion of the natural fiber material from the main body; and
   connecting the reinforcement to the recess of the main body by pressing, wherein the reinforcement is formed from the first cutout portion or a second cutout portion, and wherein the second cutout portion comprises the natural fiber material having been removed from the main body or a second main body, and wherein the second cutout portion has a second size substantially the same as the first size.

6. The method as claimed in claim 5, comprising processing the natural fiber material of the reinforcement before connecting the reinforcement to the recess of the main body.

7. The method as claimed in claim 6, wherein the natural fiber material of the reinforcement is formed before being connected to the main body.

8. A lining of a vehicle part comprising:
   a first main body portion comprising a material, wherein the first main body portion comprises a first recess having a first size, and wherein the first recess is formed by removing a first cutout portion of the material from the first main body portion; and
   a reinforcement portion disposed over the first recess of the first main body portion and formed from the first cutout portion or a second cutout portion, wherein the second cutout portion comprises the material having been removed from the first main body portion or a second main body portion, and wherein the second cutout portion has a second size substantially the same as the first size.

9. The lining of claim 8, wherein the material of the reinforcement portion is formed from the first cutout portion.

10. The lining of claim 8, wherein the reinforcement portion is configured to provide structural stability to the first main body portion.

11. The lining of claim 8, wherein the reinforcement portion comprises a plurality of ribs configured to provide structural stability to the first main body portion.

12. The lining of claim 8, wherein the reinforcement portion extends at least partially perpendicular to a substantially flat plane of the first main body portion.

13. The lining of claim 8, wherein the first main body portion comprises a second recess having the first size, and wherein the second recess is formed by removing the second cutout portion of the material from the first main body portion.

14. The lining of claim 13, comprising a second reinforcement portion disposed on the first main body portion and formed from the first cutout portion or the second cutout portion.

15. The lining of claim 8, wherein the material comprises a natural fiber material.

16. The method of claim 6, wherein processing the natural fiber material of the reinforcement comprises forming ribs on the reinforcement.

17. The method of claim 5, wherein forming the recess having the first size in the natural fiber material of the main body by removing the first cutout portion comprises stamping the main body to remove the first cutout portion.

* * * * *